H. W. OSTER.
TAP.
APPLICATION FILED JAN. 13, 1917.
1,258,239. Patented Mar. 5, 1918.
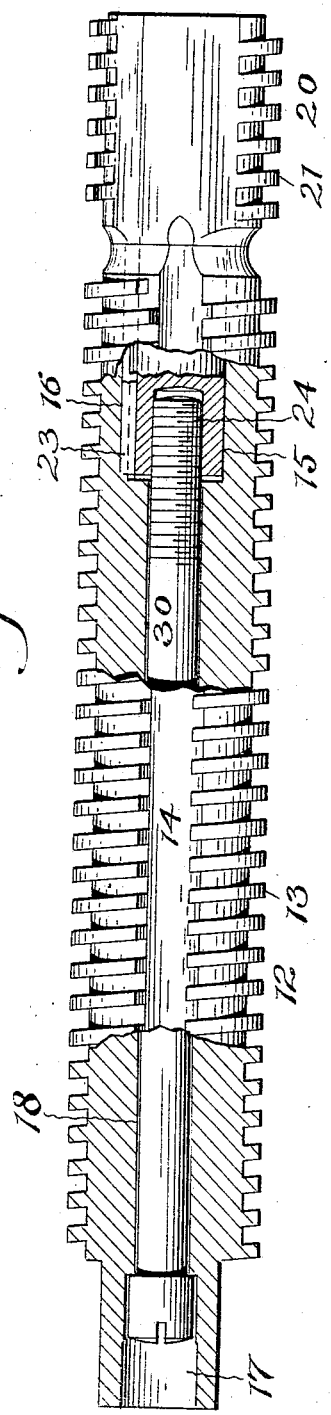
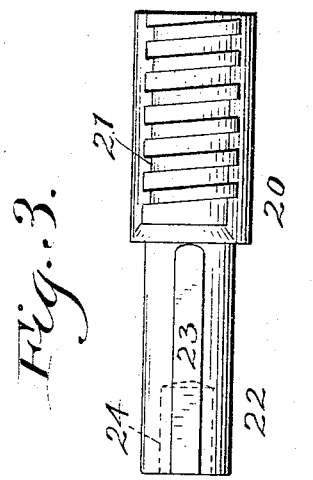
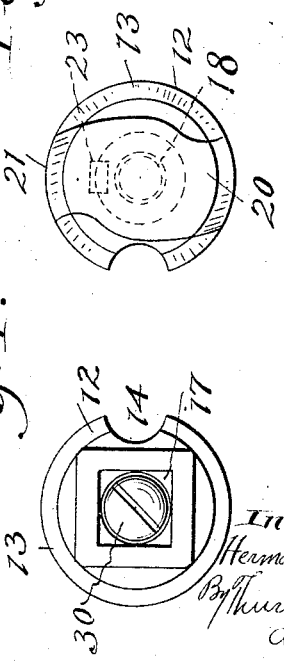

UNITED STATES PATENT OFFICE.

HERMAN W. OSTER, OF CLEVELAND, OHIO, ASSIGNOR TO THE OSTER MANUFACTURING COMPANY, OF CLEVELAND, OHIO, A CORPORATION OF OHIO.

TAP.

1,258,239.  Specification of Letters Patent.  Patented Mar. 5, 1918.

Application filed January 13, 1917. Serial No. 142,145.

*To all whom it may concern:*

Be it known that I, HERMAN W. OSTER, a citizen of the United States, residing at Cleveland, in the county of Cuyahoga and State of Ohio, have invented a certain new and useful Improvement in Taps, of which the following is a full, clear, and exact description.

Taps which are like that shown in the drawing, in respect to the construction and disposition of the spirally disposed thread cutting teeth and clearance grooves, have long been in common use, but such taps have been made of a single piece of metal. With my invention, however, the end section and the body of the tap are constructed separately, and in such form that they may be connected together with their thread cutting teeth in proper relation; and these two parts are combined with means whereby they may be accurately moved into the required relative position, and thereafter held against relative movement while they are performing their functions.

The invention consists in the construction and combination of parts shown in the drawing and hereinafter described and definitely pointed out in the appended claims.

In the drawing, Figure 1 is a side view, partly in central longitudinal section, of a tap embodying said invention, and Fig. 2 is an end view thereof; Fig. 3 is a detached view of the detachable end member; and Fig. 4 is a view of the end of the body member.

Referring to the parts by reference characters, 12 represents the tap body which is formed with external spiral threads 13 of the required pitch and shape, and with a longitudinal clearance groove 14 that is cut through the threads, thereby dividing them into teeth, and forming the cutting ends of said teeth. In one end of this body is an axially disposed cylindrical recess 15 having a longitudinal key way or groove 16; in the other end of the body is also an axially disposed recess 17, and these two recesses are connected by an axially disposed longitudinally extended hole 18.

The end member 20 is formed with spirally disposed teeth 21 which are substantially like the teeth on the body in respect to shape and pitch. There are two longitudinal rows of these teeth, and these two rows of teeth are produced and their cutting ends formed by two wide downwardly extended clearance grooves which cut through the spiral thread of which the teeth were originally formed. This end member is formed with a small diametered cylindrical shank 22 which nicely fits the recess 15; and this shank carries a key 23 for engagement in the key way 16. In the end of this shank is a threaded hole 24. The end of the body and that end of the end member from which the shank projects are so placed with respect to the teeth on these two members that, when these two ends are in contact, the teeth of one member are in proper relation to the teeth of the other member.

A long screw 30 passes through the hole 18 and screws into the threaded hole 24 in the end of the shank, and the head of this screw lies wholly within the recess 17. When this screw is turned in it draws the end member endwise relative to the body and causes the engagement of said end member with the body.

In using a tap having teeth arranged as stated the teeth 21 on the end member are the teeth which cut the thread, the teeth on the body have very little cutting to do; in fact, the main function of the spiral threads which these teeth form is to serve as a lead screw to cause the tap to advance in accordance with the pitch of the cutting teeth, and consequently of the threads which they are to cut.

Since the teeth on the body and end member are thus required to perform quite different services, it is possible with the construction above described, to make the end member of tool steel, and to make the body of carbon steel. If either one of these parts gets worn out or damaged before the other the injured part may be utilized in building up another tap of like construction.

Having described my invention, I claim:—

1. A tap comprising a body member on which are spirally disposed teeth and which has an axial hole through it, an end member having spirally disposed teeth,—one member having an axial recess in its end and the other member having a shank which fits in said recess, a screw which passes through the body member and screws into the end of the end member to bring the ends of said members into contact, and means to fix the position of one member relative to the other and to prevent their relative rotation.

2. A tap comprising a body member on which are spirally disposed teeth and which has an axially disposed socket in its end, and an axial hole through it, and an end member having external cutting teeth and having a small diametered shank which projects from one end and is fitted to the recess in the end of the body, said shank and recess being formed with a key way and a key fitted thereto, and a screw which passes through the body member and screws into the end of said shank,—the adjacent ends of the body and of the end member being so placed with respect to the teeth upon said members that when the screw brings said ends into contact the teeth on one member will be properly disposed with respect to the teeth on the other member.

In testimony whereof, I hereunto affix my signature in the presence of two witnesses.

HERMAN W. OSTER.

Witnesses:
R. B. TEWKSBURY,
E. L. THURSTON.

Copies of this patent may be obtained for five cents each, by addressing the "Commissioner of Patents, Washington, D. C."